(12) United States Patent
Trinder, II

(10) Patent No.: US 11,930,821 B2
(45) Date of Patent: Mar. 19, 2024

(54) ANTIMICROBIAL COVER SYSTEMS FOR CROWD-ACCESSED TOUCH SURFACES

(71) Applicant: EOS Surfaces, LLC, Norfolk, VA (US)

(72) Inventor: Kenneth G. Trinder, II, Norfolk, VA (US)

(73) Assignee: EDS SURFACES, LLC, Norfolk, VA (US)

(*) Notice: Subject to any disclaimer, the term of this patent is extended or adjusted under 35 U.S.C. 154(b) by 317 days.

(21) Appl. No.: 17/410,203

(22) Filed: Aug. 24, 2021

(65) Prior Publication Data

US 2022/0061330 A1 Mar. 3, 2022

Related U.S. Application Data

(60) Provisional application No. 63/071,726, filed on Aug. 28, 2020.

(51) Int. Cl.
*A01N 59/20* (2006.01)
*A01N 25/10* (2006.01)
*A01N 25/34* (2006.01)
*A01P 1/00* (2006.01)

(52) U.S. Cl.
CPC ............. *A01N 59/20* (2013.01); *A01N 25/10* (2013.01); *A01N 25/34* (2013.01); *A01P 1/00* (2021.08)

(58) Field of Classification Search
None
See application file for complete search history.

(56) References Cited

U.S. PATENT DOCUMENTS

| | | | | |
|---|---|---|---|---|
| 2,319,147 | A * | 5/1943 | Mason ................... | A47J 45/062 220/759 |
| 7,805,813 | B1 * | 10/2010 | Bunyard ................ | A47J 45/072 16/110.1 |
| 7,980,415 | B2 * | 7/2011 | Crawley ................ | B65D 25/32 220/759 |
| 8,500,609 | B1 * | 8/2013 | Williams ............... | A45B 3/00 135/65 |
| 9,463,569 | B1 * | 10/2016 | Douglas ................ | B25G 1/102 |
| 10,166,158 | B2 | 1/2019 | Trinder, II | |
| 10,632,034 | B2 | 4/2020 | Trinder, II | |
| D996,184 | S * | 8/2023 | Turk ...................... | D34/27 |
| 2013/0264810 | A1 * | 10/2013 | Carr ...................... | A63C 11/227 280/821 |
| 2015/0351406 | A1 * | 12/2015 | Wingfield ............. | A61K 33/30 424/618 |
| 2019/0076312 | A1 * | 3/2019 | Trinder, II ............ | A61G 7/0507 |
| 2020/0189796 | A1 * | 6/2020 | Joseph .................. | B65D 25/32 |
| 2022/0054680 | A1 * | 2/2022 | Loucks ................. | B62B 5/06 |

* cited by examiner

*Primary Examiner* — Lee E Sanderson
(74) *Attorney, Agent, or Firm* — Peter J. Van Bergen

(57) ABSTRACT

An antimicrobial cover system for tubular structures includes a pair of identical cover portions. Each cover portion's outer surface is defined by an antimicrobial material and its inner surface is longitudinally corrugated. Each cover portion has a first longitudinal edge and a second longitudinal edge. The first longitudinal edge includes a first tab and a first socket, and the second longitudinal edge includes a second tab and a second socket. When the cover portions are adapted to encase a tubular structure, the first tab of a first of the cover portions is engaged in the second socket of a second of the cover portions, and the second tab of the second of the cover portions is engaged in the first socket of the first of the cover portions.

12 Claims, 10 Drawing Sheets

ANTIMICROBIAL COVER SYSTEMS FOR CROWD-ACCESSED TOUCH SURFACES

Pursuant to 35 U.S.C. § 119, the benefit of priority from provisional application 63/071,726, with a filing date of Aug. 28, 2021, is claimed for this non-provisional application.

FIELD OF THE INVENTION

The invention relates generally to antimicrobial coverings, and more particularly to antimicrobial cover systems for a variety of structures that will be accessed and touched by crowds of people.

BACKGROUND OF THE INVENTION

Microbes, to include bacteria, fungi, viruses and spores, are readily deposited on hard surfaces. The presence of small amounts of moisture on such surfaces promotes microbe growth. Human or any host contact with such surfaces provides a transmission vehicle for the microbes leading to further deposition, growth, transmission, and, in many cases, human infection.

Microbe growth and transmission are of great concern in a variety of venues frequented by crowds of people such as sports/event stadiums, amusement or theme parks, entertainment venues, mass transit stations, and mass transit vehicles. All of these venues include frequently-accessed touch structures that can include, for example, entry/exit turnstiles and vehicle/ride grab bars/poles. Such touch structures are prime candidates for microbe infection.

Actively disinfecting crowd-accessed touch structures is a time-consuming process that is often neglected due to cost, forgetfulness, or lack of concern. Replacement of crowd-accessed touch structures with completely new structures embodying microbe-susceptible contact surfaces with antimicrobial materials (e.g., the antimicrobial solid surface material disclosed in PCT Application No. PCT/US2013/054040) is a costly proposition beyond the budget constraints of many businesses, institutions and/or cities/municipalities.

SUMMARY OF THE INVENTION

Accordingly, it is an object of the present invention to provide an antimicrobial cover system for crowd-accessed touch structures.

Other objects and advantages of the present invention will become more obvious hereinafter in the specification and drawings.

In accordance with the present invention, an antimicrobial cover system for frequently-touched tubular structures includes a pair of identical cover portions. Each cover portion has an outer surface and an inner surface where the outer surface is defined by an antimicrobial material and the inner surface is longitudinally corrugated. Each cover portion has a first longitudinal edge and a second longitudinal edge. The first longitudinal edge includes a first tab and a first socket, and the second longitudinal edge includes a second tab and a second socket. When the cover portions are adapted to encase a tubular structure, the first tab of a first of the cover portions is engaged in the second socket of a second of the cover portions, and the second tab of the second of the cover portions is engaged in the first socket of the first of the cover portions.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
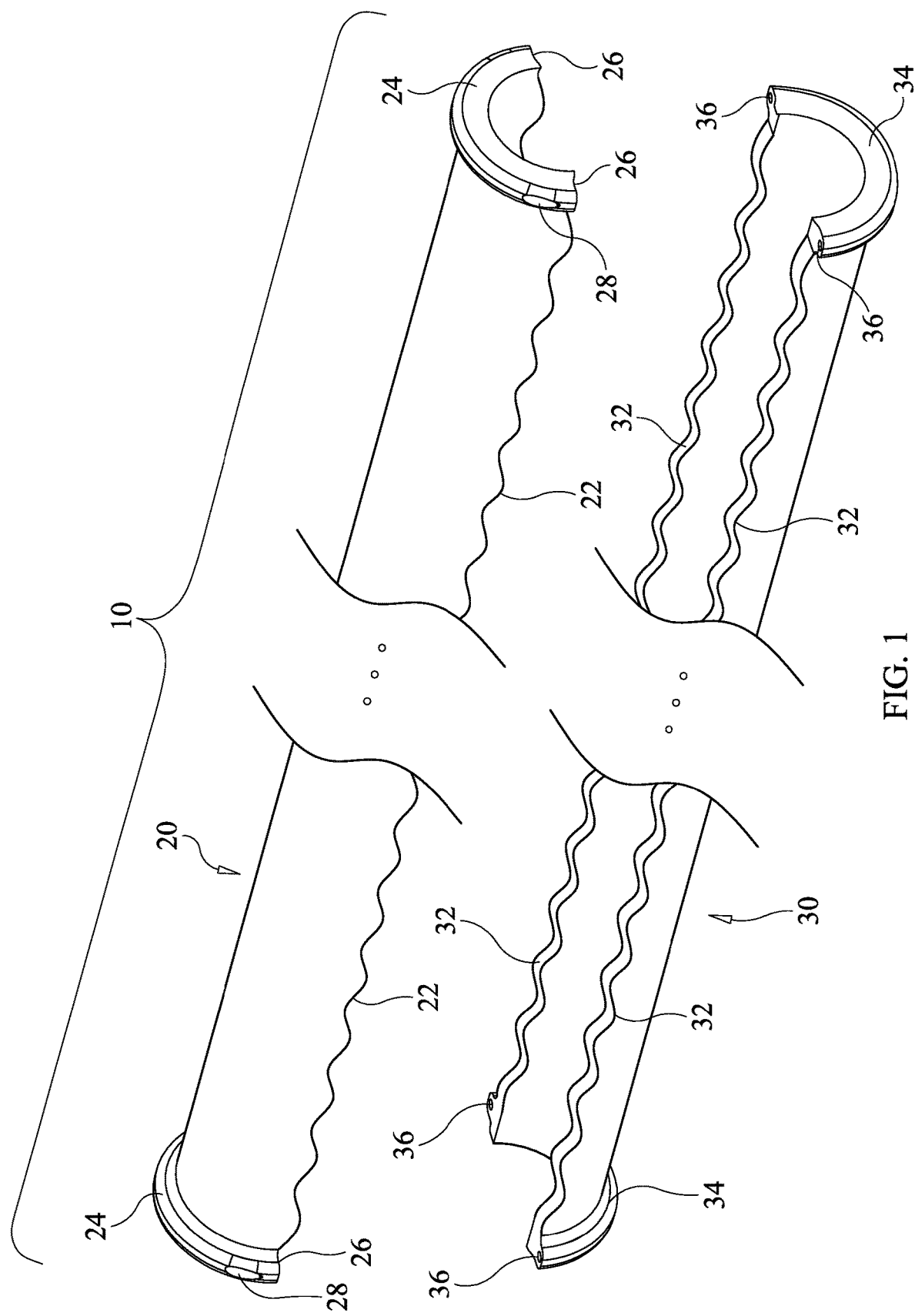
FIG. 1 is an exploded perspective view of a straight antimicrobial cover system for a crowd-accessed touch structure in accordance with an embodiment of the present invention.

Referring now to the drawings and more particularly to FIG. 1, an antimicrobial cover system for a crowd-accessed and frequently-touched structure (not shown) in accordance with an embodiment of the present invention is shown and is referenced generally by numeral 10. In the illustrated embodiment, cover system 10 is a straight cylindrical structure that includes a first radial half 20 and a second radial half 30. When assembled over an existing frequently-touched structure, cover system 10 is a rigid cylindrical structure whose outer surface becomes the frequently-touched surface that will be accessed/touched by large numbers of people. As will be explained further below, radial halves 20 and 30 are joined to encase an existing straight tubular structure. The length of cover system 10 is not a limitation of the present invention. In the various embodiments of the present invention that will be described herein, it is assumed that the tubular structure to be encased is cylindrical. However, it is to be understood that the present invention can be adapted to work with other geometrically-shaped tubular structures without departing from the scope of the present invention.

In accordance with the present invention, radial halves 20 and 30 can be entirely made from antimicrobial or biocidal material or can be constructed such that at least exposed or touch/contact surfaces of radial halves 20/30 are made from antimicrobial or biocidal materials. By way of example, the exposed surfaces of halves 20 and 30 can be a composite solid material made from a polymeric resin with copper oxide particles mixed therein disclosed in PCT Application No. PCT/US2013/054040, the entire contents of which are hereby incorporated by reference. It is to be understood that other antimicrobial or biocidal materials could be used without departing from the scope of the present invention. When the entirety of the cover system is made using such antimicrobial materials, each cover half could be cast, molded, extruded, or fabricated in a variety of ways without departing from the scope of the present invention.

In addition to its antimicrobial features described above, cover system 10 includes novel features that simplify installation of the cover system, assure a proper installation of the cover system, minimize moisture infiltration into the cover system following installation thereof, and assure the assembled integrity of the cover system after the installation thereof. These features will now be described with additional and simultaneous reference to an embodiment of the present invention illustrated in FIGS. 2-4.

Figure 2:
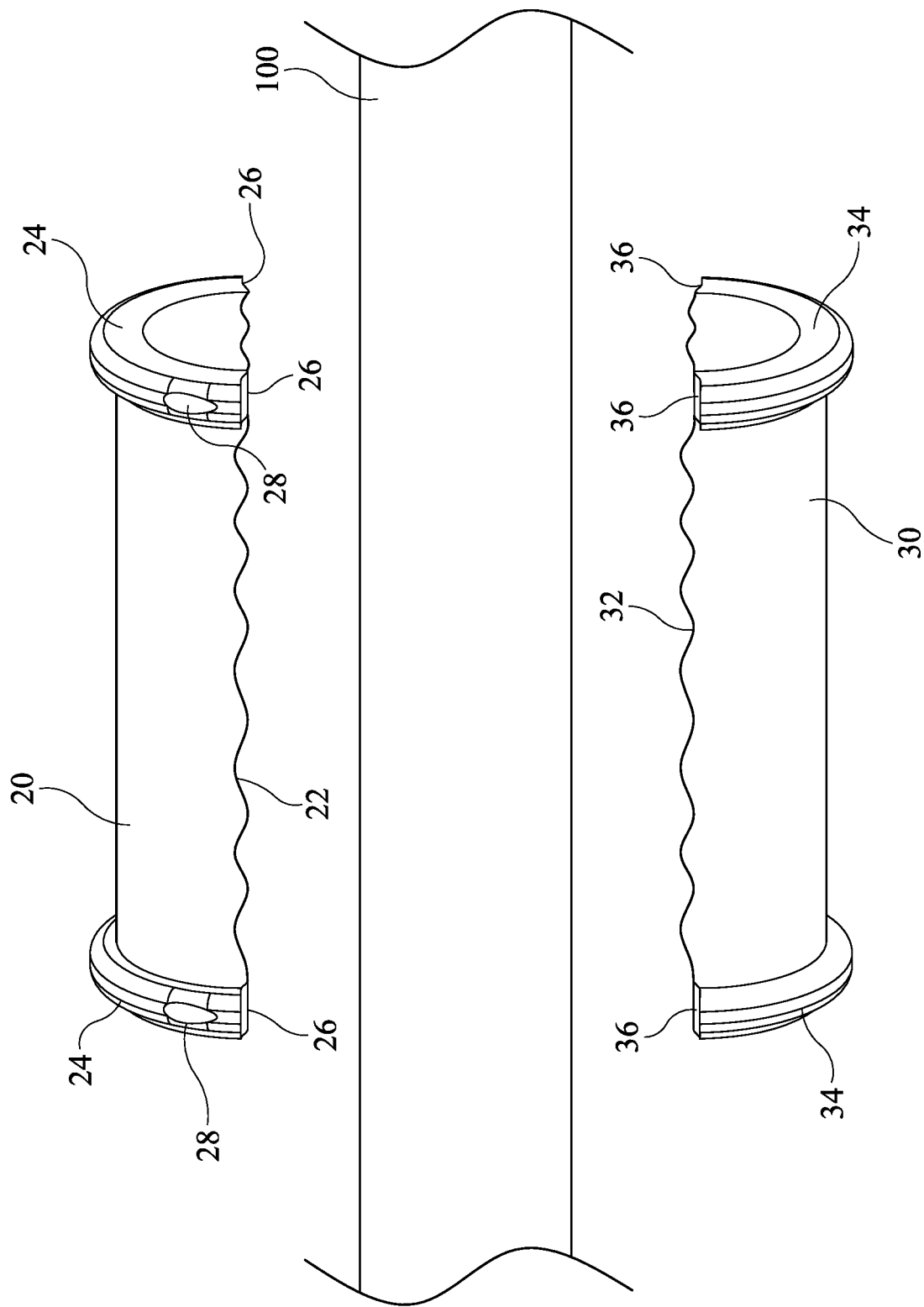
FIG. 2 is an exploded perspective view of a straight antimicrobial cover system positioned for encapsulation of a portion of a cylindrical crowd-accessed touch structure.
Figure 4:
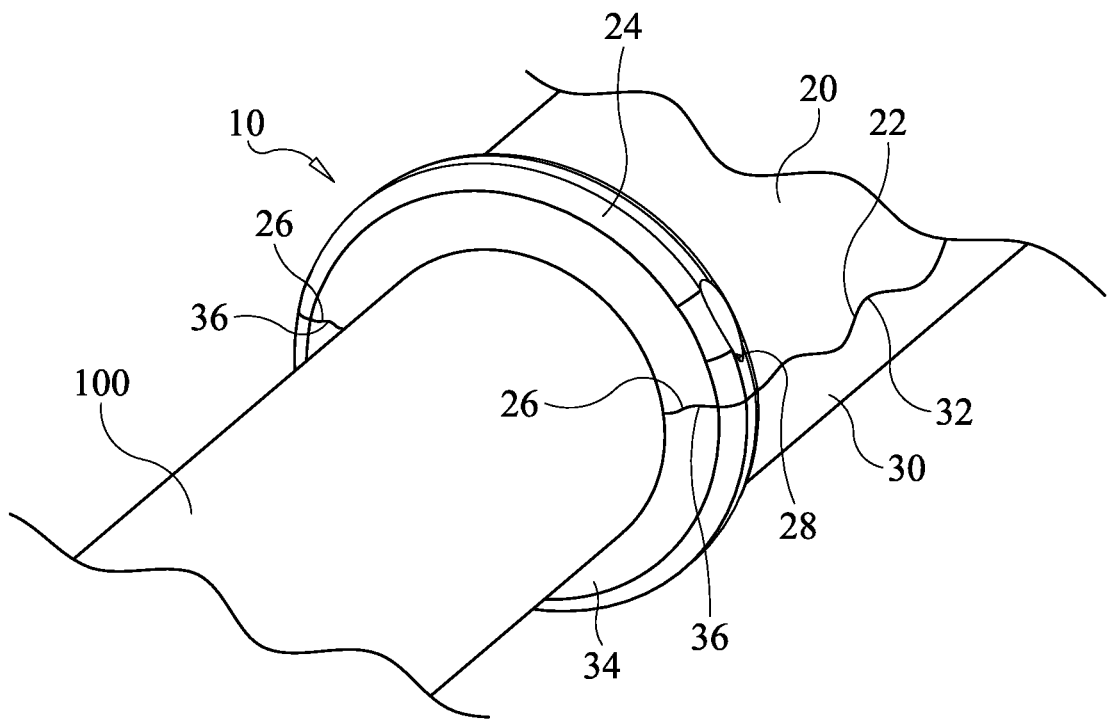
FIG. 4 is an isolated and enlarged perspective view of one end of an antimicrobial cover system encapsulating a portion of a cylindrical crowd-accessed touch structure in accordance with an embodiment of the present invention.

Longitudinal edges 22 and 32 of radial halves 20 and 30, respectively, are configured to define a periodic wave (e.g., sinusoidal wave as shown, saw tooth wave, square wave, etc.), the choice of which is not a limitation of the present invention. Longitudinal edges 22 and 32 are complementary such that they are fully in contact with one another when radial halves 20 and 30 are joined about a tubular structure 100 as shown in FIGS. 2 and 4. When fully in contact with one another, halves 20 and 30 are axially restrained or locked depending on the type of periodic wave shape used for edges 22 and 32. Each end of half 20 and half 30 is defined by a half flange 24 and a half flange 34, respectively. The outboard ends 26 and 36 of respective half flanges 24 and 34 are configured to define a contour or wave shape with contoured ends 26 and 36 being complementary such that they are fully in contact with one another when joined about tubular structure 100 as shown in FIG. 4.

Figure 3:
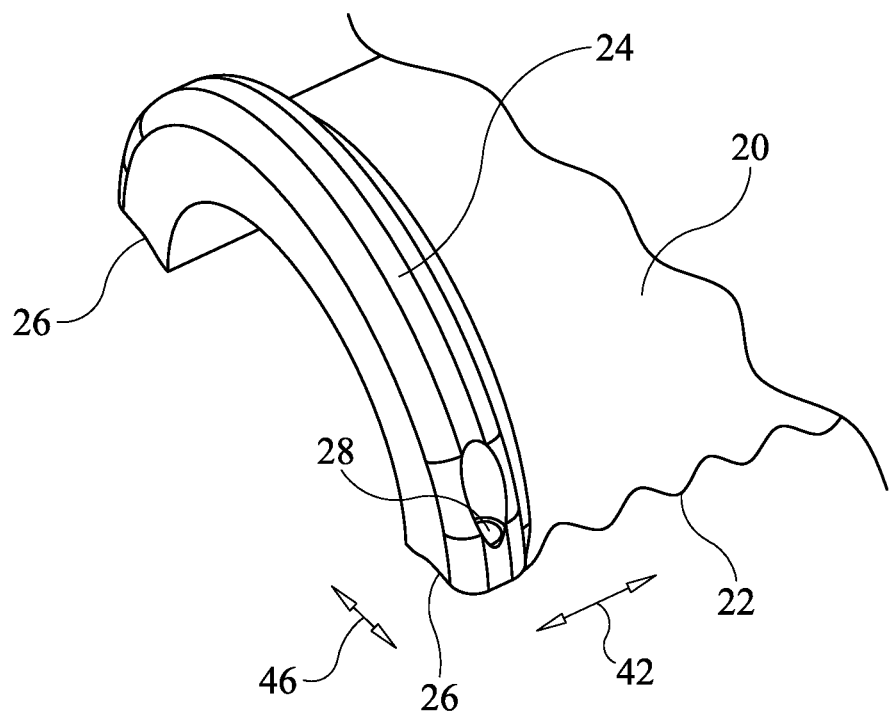
FIG. 3 is an isolated and enlarged perspective view of one end of one half of an antimicrobial cover system in accordance with an embodiment of the present invention.

As best illustrated in FIG. 3, the contour or wave direction 46 of contoured end 26 is perpendicular to the wave direction 42 of the periodic wave used at longitudinal edge 22. The same perpendicular relationship exists between the wave shapes at contoured end 36 and longitudinal edge 32. In this way, halves 20 and 30 are restrained/locked axially by edges 22/32 and are restrained/locked radially by ends 26/36 when cover system is being installed and thereafter. This structure simplifies installation and assures the halves are in their proper relationship prior to the joining thereof. Further, once joined, the interlocking relationships distribute loads acting on the cover system to thereby assure the assembled integrity of the installed cover system throughout multiple uses and handling thereof. Still further, the wave-shaped joins minimize moisture infiltration since there are no "straight line" joins providing a path of least resistance for moisture flow. In the illustrated embodiment, pilot holes 28 are provided in half flanges 24 for receipt of screws (not shown) that are driven into adjoining half flanges 34 during installation of the cover system.

As mentioned above, when halves 20 and 30 have their exposed surfaces or their entire structure made from an antimicrobial material, the resulting cover system defines a hard surface that continually provides biocidal treatment of microbes deposited thereon without any periodic disinfection operation being required. To further enhance the material surface's biocidal activity, the cover portions of the present invention can have their outer surfaces constructed to provide increased surface area. The increased surface area enhances the biocidal activity at the cover's outer surfaces. Since microbes are microscopic particles, surface treatment of the covers' outer surfaces can occur at either microscopic or macroscopic levels. For example, it may be desired for the outer surfaces of the covers to present a macroscopically smooth surface for purpose of aesthetics, ease of cleaning, etc. In this case, biocidal enhancement could be provided via a microscopic texturing (e.g., piercing, roughening, etc.) of the covers' outer surfaces. Such microscopic texturing can be incorporated into a molding or casting process. Such microscopic texturing is described in U.S. Pat. Nos. 10,166,158 and 10,632,034, the contents of which are hereby incorporated by reference.

Figure 5:
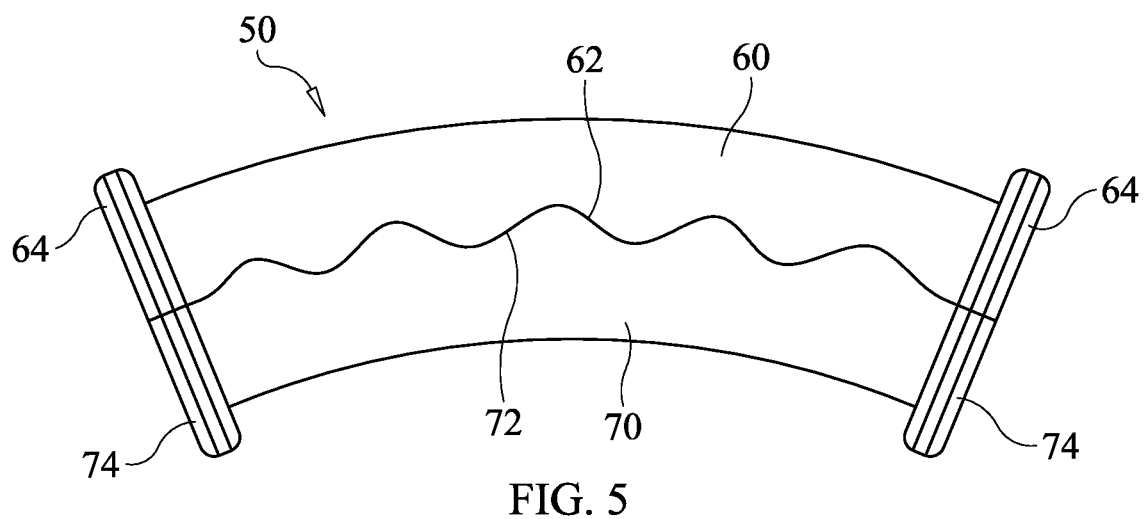
FIG. 5 is a side view of a curved antimicrobial cover system for a crowd-accessed touch structure in accordance with another embodiment of the present invention.
Figure 6:
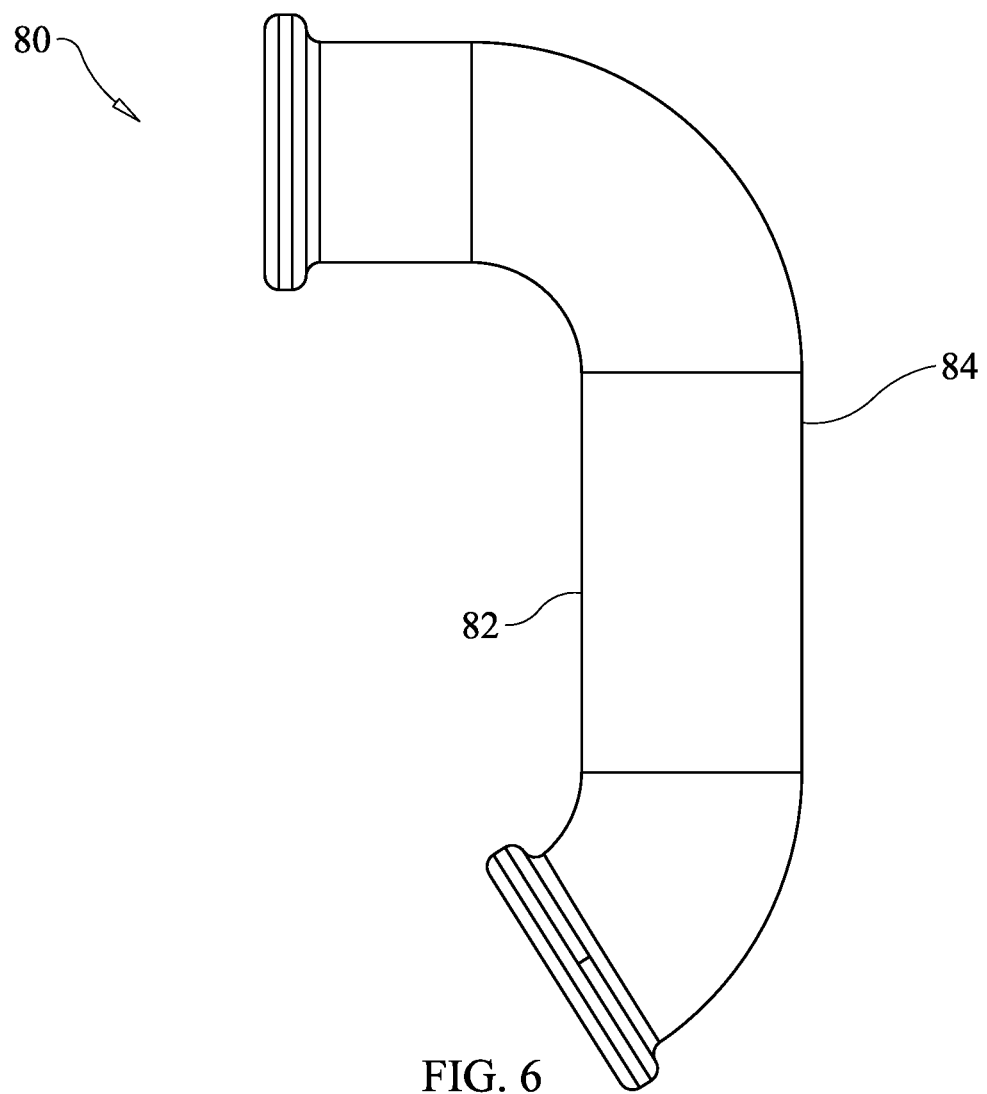
FIG. 6 is a side view of an irregularly-shaped antimicrobial cover system for a crowd-accessed touch structure in accordance with another embodiment of the present invention.

The present invention is not limited to straight cover systems. For example, FIG. 5 illustrates a curved cover system 50 and FIG. 6 illustrates an irregularly-shaped cover system 80. Similar to the straight cover system, curved cover system 50 includes halves 60/70 that meet along complementary periodic-wave-shaped edges 62/72. Each of halves 60 and 70 terminates in a half flange 64 and 74, respectively, that can be configured as described previously herein. Irregularly-shaped cover system 80 can be similarly constructed with the complementary periodic-wave-shaped edges (not visible in FIG. 6) lying along the concave side 82 and convex side 84 of cover system 80.

Figure 7:
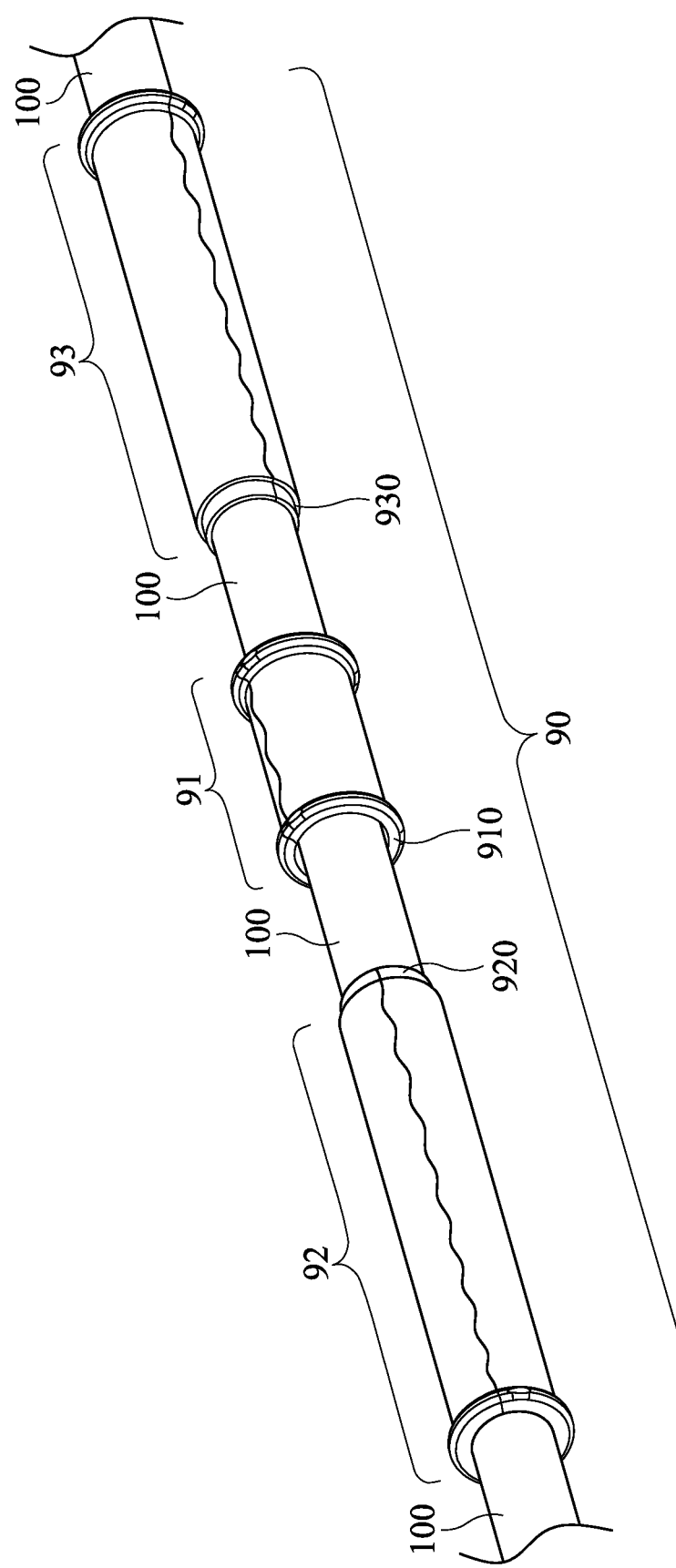
FIG. 7 is a perspective view of a multi-section antimicrobial cover system encapsulating a portion of a cylindrical crowd-accessed touch structure prior to the joining of adjacent sections in accordance with another embodiment of the present invention.
Figure 8:
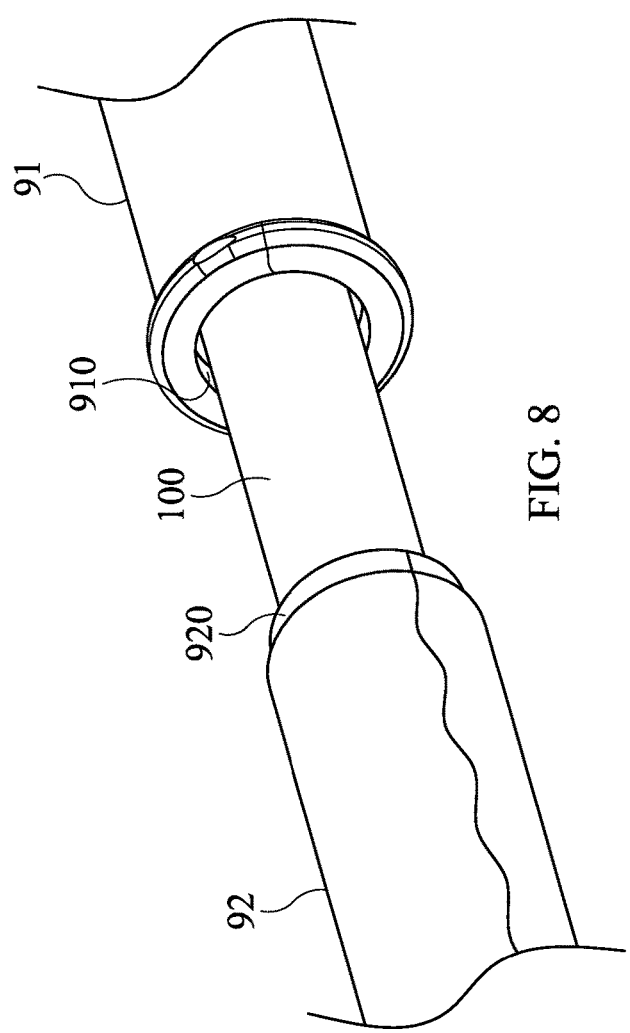
FIG. 8 is an enlarged perspective view of adjoining portions of the multi-section antimicrobial cover system shown in FIG. 7.
Figure 9:
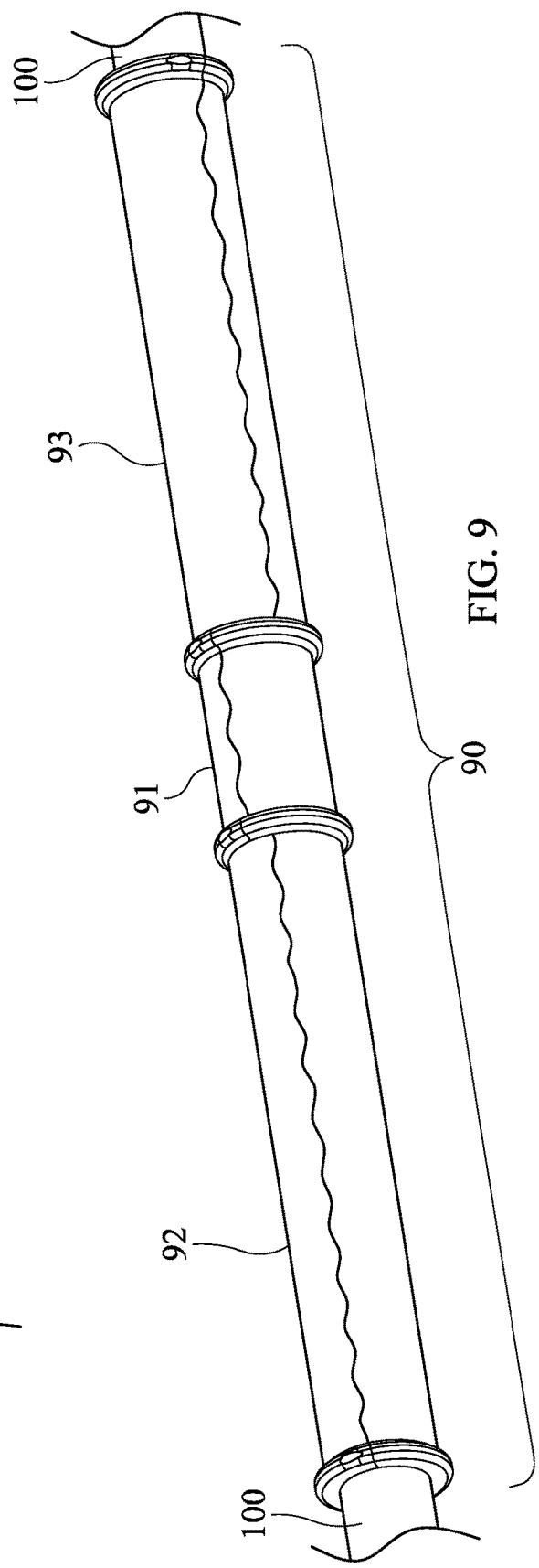
FIG. 9 a perspective view of the fully-adjoined multi-section antimicrobial cover system shown in FIG. 7.

In other embodiments of the present invention, cover systems are multi-sectional to facilitate construction and/or installation procedures. By way of an illustrative example, a multi-section antimicrobial cover system in accordance with the present invention will be described with simultaneous reference to FIG. 7-9. In the illustrated embodiment, a multi-section cover system 90 is shown as it would be installed on tubular structure 100. Cover system 90 includes a center section 91 and end sections 92/93 sandwiched about center section 91. Each of sections 91-93 has the same longitudinal edge and contoured end features described previously herein. The ends of sections 92 and 93 that are to adjoin with center section 91 are configured to define an annular "tongue" 920 and 930, respectively, that will engage with a corresponding groove 910 defined at each axial end of center section 91.

Figure 10:
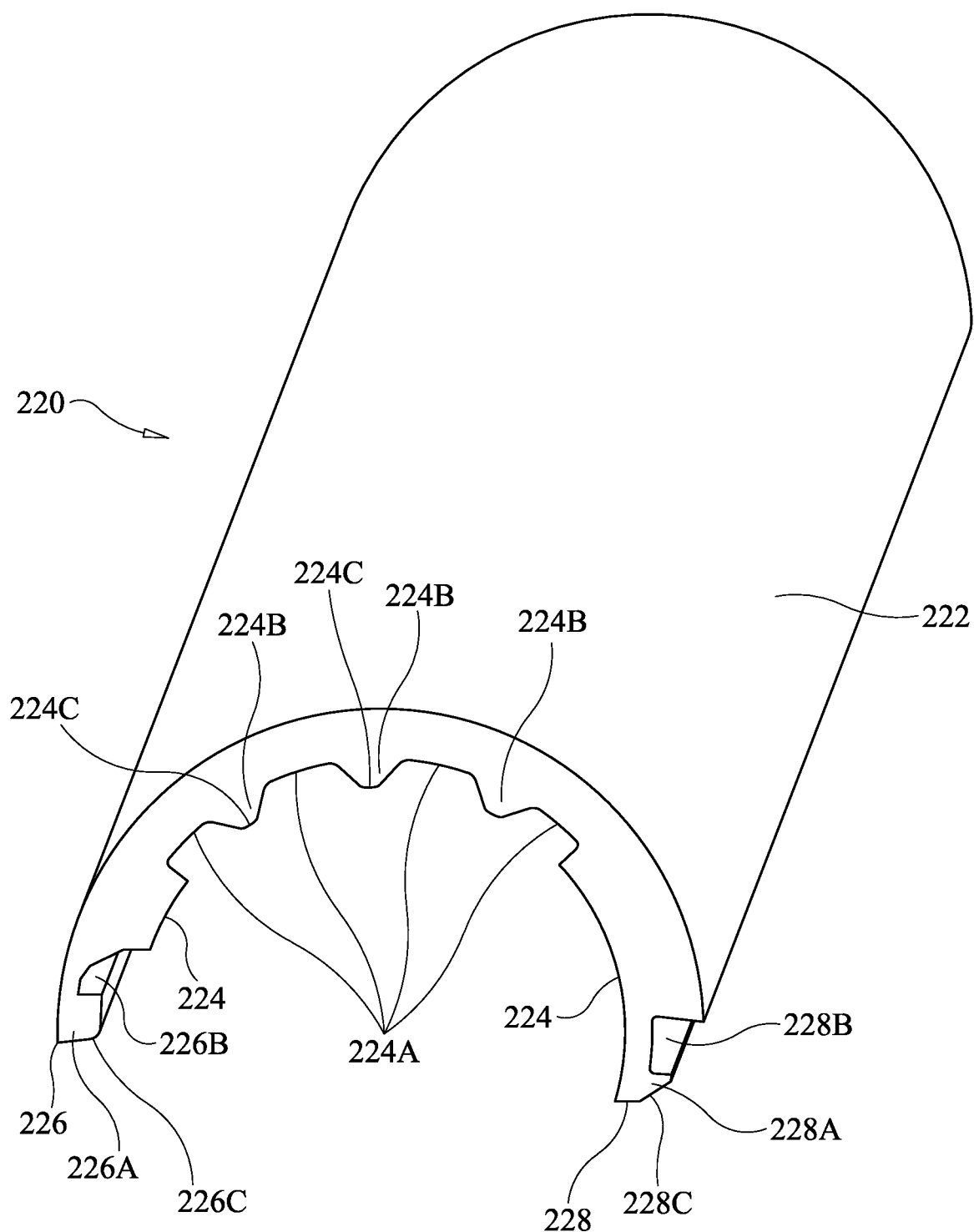
FIG. 10 is a perspective view of one cover portion of a straight antimicrobial cover system for a crowd-accessed tubular structure in accordance with another embodiment of the present invention.
Figure 11:
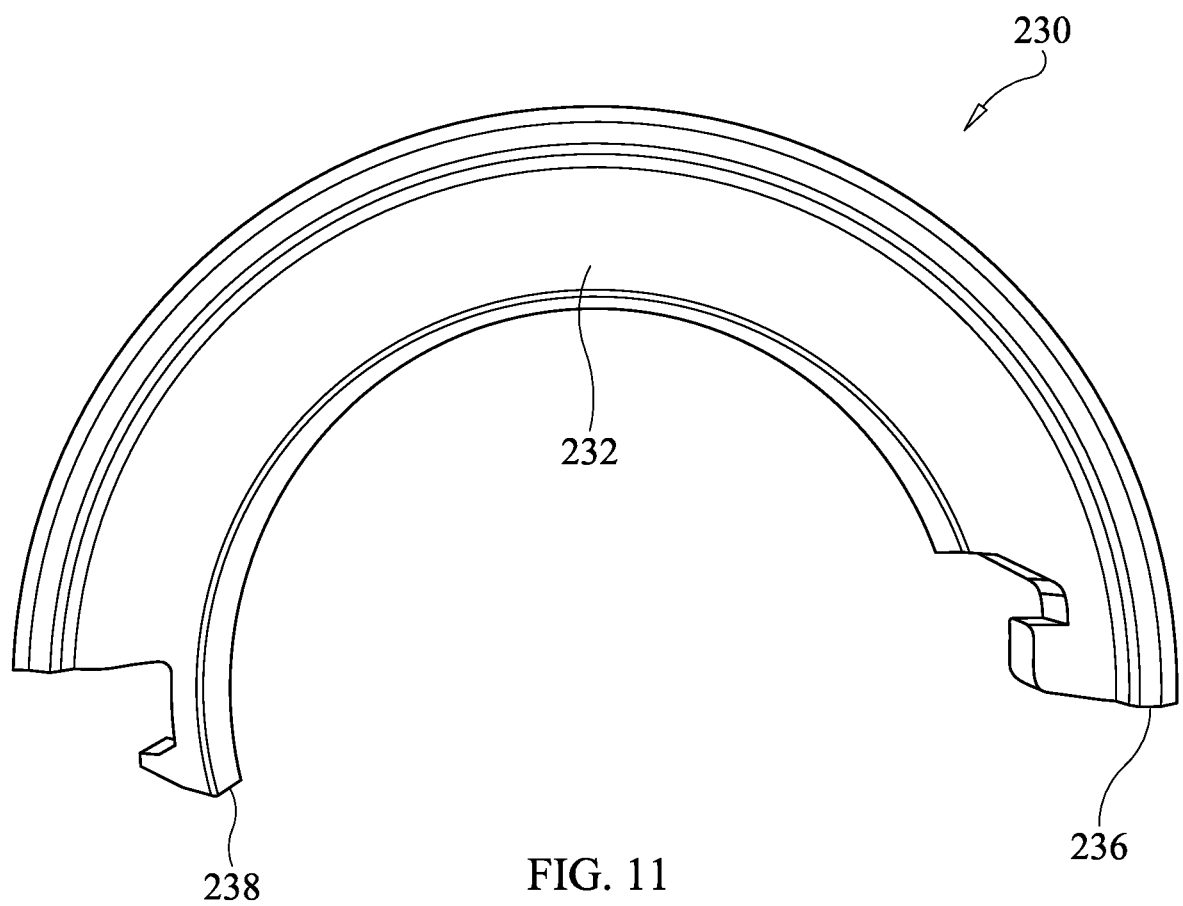
FIG. 11 is a perspective view of one-half of an end cap that can be used in combination with a cover system constructed using two of the cover portions illustrated in FIG. 10.

Another embodiment of an antimicrobial cover system in accordance with the present invention will now be described with simultaneous reference to FIGS. 10-12. As in the previously-described embodiments, the cover system includes two portions or radial halves that, when joined together, create a cylindrical cover. In this embodiment, the radial halves used in the cover system are identical thereby greatly simplifying manufacturing, inventorying, assembly, etc. One radial half is illustrated in FIG. 10 and is referenced generally by numeral 220. Two radial halves 220 are used in the construction of a cylindrical cover system (FIG. 12) encasing a tubular structure 100 as will be explained later below. Radial half 220 can be straight along its length (as shown) or curved along its length without departing from the scope of the present invention. Furthermore, it is to be understood that radial half 220 is configured to have any or all of the antimicrobial or biocidal material properties and features described previously herein. For example, radial half 220 can be a solid monolithic structure made completely from an antimicrobial material.

Radial half 220 has an outer circumferential surface 222 that can be microscopically textured as described earlier herein. Some or all of an inner circumferential surface 224 of radial half 220 is configured to define an alternating series of longitudinally-extending valleys 224A and longitudinally-extending ridges 224B. In other words, inner circumferential surface 224 is longitudinally corrugated. The combination of valleys 224A and ridges 224B allow radial half 220 to flex slightly to accommodate variations in a tubular structure that the cover system will engage. Further, valleys 224A provide reservoirs for adhesive as will be described further below. Still further, the slight flexibility provided by the longitudinally-corrugated inner surface 224 ensures that the longitudinal crest 224C of each ridge 224B can adapt to dimensional imperfections in tubular structure 100 as it is covered.

Figure 12:
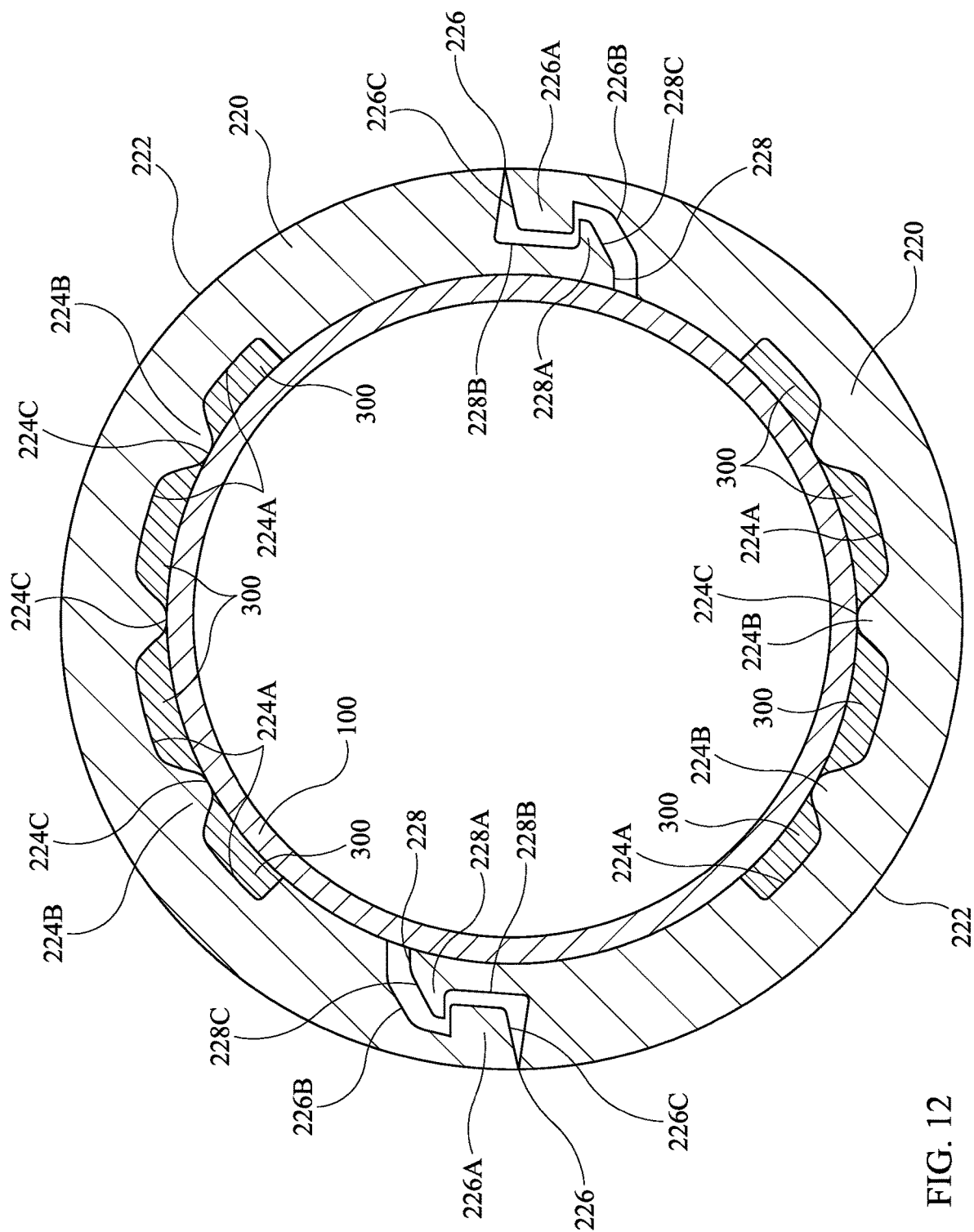
FIG. 12 is a cross-sectional view of a tubular structure encased with a cover system constructed from two identical cover portions illustrated in FIG. 10 and an adhesive in accordance with an embodiment of the present invention.

The outboard longitudinal edges 226 and 228 of radial half 220 are configured to mate with another radial half 220 as shown in FIG. 12. More specifically, each edge 226 includes a longitudinally-extending tab 226A and a longitudinally-extending socket 226B along the entire length of radial half 220. Each edge 228 includes a longitudinally-extending socket 228B and a longitudinally-extending tab 228A along the entire length of radial half 220. When the cover system is assembled, a first radial half's edge 226 is engaged with a second radial half's edge 228, and the first radial half's edge 228 is engaged with the second radial half's edge 226 as will be explained further below.

When two radial halves 220 are to be mated about and adhered to a tubular structure 100 (FIG. 12), valleys 224A are filled with an adhesive 300 (e.g., a liquid adhesive suitable for bonding to both inner surface 224 and the surface of tubular structure 100) and the two radial halves 220 are pressed together about tubular structure 100. In areas where any of ridges 224B do not fully contact the surface of tubular structure 100, adhesive 300 will flow to fill available spaces between radial halves 220 and tubular structure 100 as two radial halves 220 are pressed into engagement with one another. To facilitate pressed engagement of the radial halves, each of tabs 226A and 228A is configured with an angled slide surface 226C and 228C, respectively. When two radial halves 220 are pressed together, angled slide surfaces 226C/228C engage along the longitudinal edges of both radial halves 220 to facilitate the ultimate engagement of each tab 228A in a corresponding socket 226B and each tab 226A in a corresponding socket 228B.

In some applications, it may be necessary or desired to cap one or both of the longitudinal ends of two joined radial halves 220. Accordingly, FIG. 11 illustrates an end cap half 230 having a flat region 232 that will engage with one half of a longitudinal end of two joined radial halves 220. End cap half 230 has outboard longitudinal edges 236 and 238 that can be configured similarly to the above-described edges 226 and 228 of radial half 220. Two end cap halves 230 are joined to form an annular cap that is annularly disposed about the tubular structure being covered and abuts the axial end of two joined radial halves 220.

Figure 13:
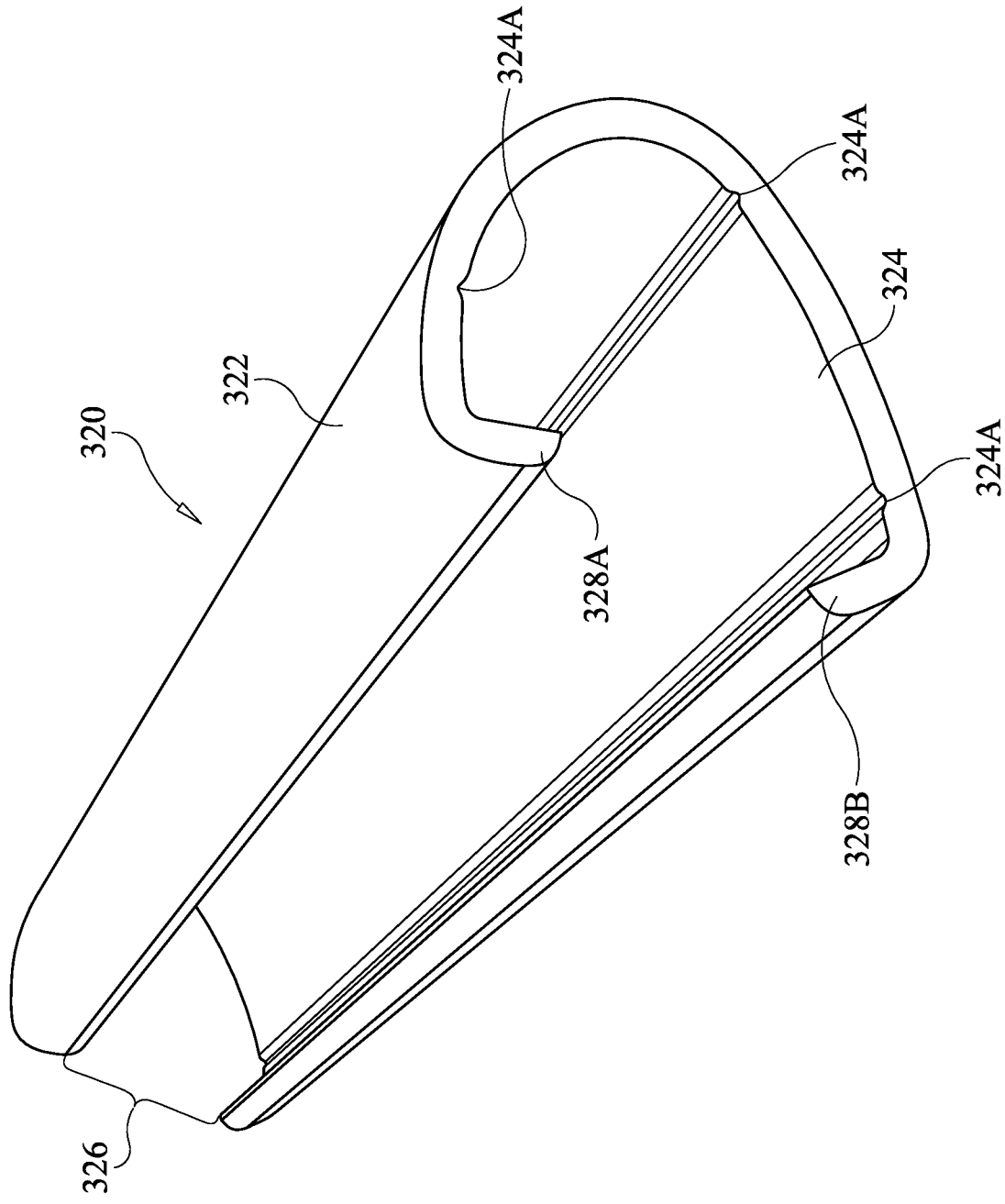
FIG. 13 is a perspective view of a straight one-piece antimicrobial cover element for use in a cover system for a non-cylindrical, crowd-accessed tubular structure in accordance with another embodiment of the present invention.

As mentioned above, the present invention can be adapted to work with non-cylindrical tubular structures. For example and as illustrated in FIG. 13, a one-piece cover 320 has an outer surface 322 made from an antimicrobial material that can be microscopically textured as described above. The inner surface 324 is configured to mate with a non-cylindrical tubular structure (not shown) and to define a series of spaced-apart longitudinally-extending valleys 324A that can be filled with an adhesive (not shown) at time of installation. Cover 320 is open at 326 along its entire length, and has longitudinally-extending lips 328A and 328B configured to help retain cover 320 in place once it is snapped onto a tubular structure.

The advantages of the present invention are numerous. The antimicrobial cover system provides a simple and long-term solution for microbe protection of a variety of crowd-accessed contact surfaces that are breeding grounds for microbe growth. The cover systems can be installed "in situ" and in minutes by maintenance personnel with little or no training. The antimicrobial material provides long-term biocidal activity that can be enhanced by microscopic texturing having no impact on the macroscopic feel or appearance of the cover system.

Although the invention has been described relative to specific embodiments thereof, there are numerous variations and modifications that will be readily apparent to those skilled in the art in light of the above teachings. For example, small pieces of adhesive strips/tape could be provided on inside surface regions of the covers to hold the covers in place during the assembly process and/or make their installation more permanent. Further, the covers of the present invention could include other decorative and/or functional materials to satisfy an application's requirements. It is therefore to be understood that, within the scope of the appended claims, the invention may be practiced other than as specifically described.

What is claimed as new and desired to be secured by Letters Patent of the United States is:

1. An antimicrobial cover system for frequently-touched tubular structures, comprising:
   a pair of identical cover portions,
   each of said cover portions having an outer surface and an inner surface,
   said outer surface defined by an antimicrobial material,
   said inner surface being longitudinally corrugated, and
   each of said cover portions having a first longitudinal edge and a second longitudinal edge, said first longitudinal edge including a first tab and a first socket, said second longitudinal edge including a second tab and a second socket,
   wherein, when said cover portions are adapted to encase a tubular structure, said first tab of a first of said cover portions is engaged in said second socket of a second of said cover portions, and said second tab of said second of said cover portions is engaged in said first socket of said first of said cover portions; and
   an adhesive for bonding to said inner surface of each of said cover portions and adapted to bond to the tubular structure.

2. An antimicrobial cover system as in claim 1, wherein said outer surface of said cover portions comprises a microscopically textured surface.

3. An antimicrobial cover system as in claim 1, wherein said antimicrobial material comprises a polymeric resin with copper oxide particles mixed therein.

4. An antimicrobial cover system as in claim 1, wherein each of said cover portions comprises a solid polymeric resin with copper oxide particles mixed therein.

5. An antimicrobial cover system as in claim 1, further comprising an annular end cap abutting an axial end of said cover portions encasing the tubular structure.

6. An antimicrobial cover system for frequently-touched tubular structures, comprising:
- a pair of identical cover portions,
- each of said cover portions having an outer surface and an inner surface,
- said outer surface defined by an antimicrobial material,
- said inner surface including an alternating series of longitudinally-extending valleys and ridges, and
- each of said cover portions having a first longitudinal edge and a second longitudinal edge, said first longitudinal edge including a first tab and a first socket, said second longitudinal edge including a second tab and a second socket,
- wherein, when said cover portions are adapted to encase a tubular structure, said first tab of a first of said cover portions is engaged in said second socket of a second of said cover portions, and said second tab of said second of said cover portions is engaged in said first socket of said first of said cover portions; and
- an adhesive filling each of said valleys, said adhesive bonding to said inner surface and adapted to bond to the tubular structure.

7. An antimicrobial cover system as in claim 6, wherein said outer surface of said cover portions comprises a microscopically textured surface.

8. An antimicrobial cover system as in claim 6, wherein said antimicrobial material comprises a polymeric resin with copper oxide particles mixed therein.

9. An antimicrobial cover system as in claim 7, wherein each of said cover portions comprises a solid polymeric resin with copper oxide particles mixed therein.

10. An antimicrobial cover system as in claim 7, further comprising an annular end cap abutting an axial end of said cover portions encasing the tubular structure.

11. An antimicrobial cover system for frequently-touched tubular structures, comprising:
- a pair of identical cover portions, each of said cover portions comprising a solid polymeric resin with copper oxide particles mixed therein,
- each of said cover portions having an outer surface and an inner surface,
- said outer surface comprising a microscopically textured surface,
- said inner surface including an alternating series of longitudinally-extending valleys and ridges, and
- each of said cover portions having a first longitudinal edge and a second longitudinal edge, said first longitudinal edge including a first tab and a first socket, said second longitudinal edge including a second tab and a second socket,
- wherein, when said cover portions are adapted to encase a tubular structure, said first tab of a first of said cover portions is engaged in said second socket of a second of said cover portions, and said second tab of said second of said cover portions is engaged in said first socket of said first of said cover portions; and
- an adhesive filling each of said valleys, said adhesive bonding to said inner surface and adapted to bond to the tubular structure.

12. An antimicrobial cover system as in claim 11, further comprising an annular end cap abutting an axial end of said cover portions encasing the tubular structure.

* * * * *